April 5, 1927.　　　D. E. HENNESSY　　　1,623,183
VULCANIZATION
Filed Aug. 19, 1922
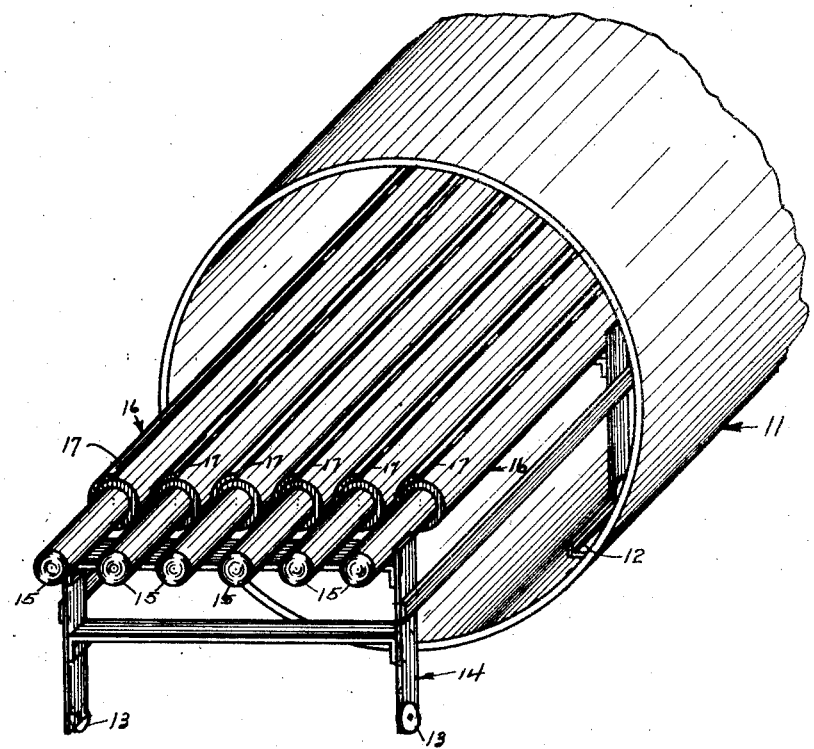
DANIEL E. HENNESSY
INVENTOR
BY Hadley Freeman
ATTORNEY Patented Apr. 5, 1927.

1,623,183

UNITED STATES PATENT OFFICE.

DANIEL E. HENNESSY, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

VULCANIZATION.

Application filed August 19, 1922. Serial No. 582,957.

My invention relates to curing, more particularly to curing inner tubes without a cross-wrapper, and the principal object of my invention is to provide a new and improved method of so curing such tubes.

In the drawings accompanying this specification and forming a part thereof I have shown, for purposes of illustration, one form which my invention may assume. In these drawings:—

The single figure is a perspective view of this illustrative embodiment.

In the drawings I have shown a heater 11 having a pair of channels 12 adapted to receive the rollers 13 of the carriage 14 which is adapted to carry a plurality of mandrels 15 about each of which is encircled the raw stock 16 which may be wound upon the mandrels in the usual way, cross-wrapped at the ends only, and cured in open heat.

In curing tubes in this manner considerable difficulty has been experienced with seam marks. Upon investigation I find that this is largely due to the opening of the splice under the action of gravity after the stock has been softened by heat and before it has vulcanized. I find, however, that if the splice is placed directly above the mandrel the weight of the stock will cause the overlapping edge to merge, when softened, into the wall of the tube to present a tube unmarred by seam marks and tightly spliced.

I have disclosed a specific embodiment of my invention but this disclosure is illustrative only and my invention is not limited thereto.

I claim:

1. The method of vulcanizing inner tubes in open heat comprising placing the splice directly above the mandrel so that when the rubber softens the edge of the splice will merge into the walls of said tube to form a tube of substantially smooth surface.

2. The method of vulcanizing inner tubes comprising placing the splice directly above the mandrel and curing in open heat.

In testimony whereof I have signed my name to the above specification.

DANIEL E. HENNESSY.